US012387628B2

(12) United States Patent
Harms et al.

(10) Patent No.: US 12,387,628 B2
(45) **Date of Patent: *Aug. 12, 2025**

(54) SIGN WITH INSERTABLE FRAME

(71) Applicant: Gill Studios, Inc., Lenexa, KS (US)

(72) Inventors: Jeffrey W. Harms, Lawrence, KS (US); Mark S. Gilman, Shawnee Mission, KS (US)

(73) Assignee: Gill Studios, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,475

(22) Filed: Nov. 9, 2023

(65) Prior Publication Data

US 2024/0078933 A1 Mar. 7, 2024

Related U.S. Application Data

(63) Continuation of application No. 17/731,001, filed on Apr. 27, 2022, now Pat. No. 11,837,116.

(60) Provisional application No. 63/180,554, filed on Apr. 27, 2021.

(51) Int. Cl.
*G09F 7/18* (2006.01)

(52) U.S. Cl.
CPC ........ *G09F 7/18* (2013.01); *G09F 2007/1834* (2013.01)

(58) Field of Classification Search
CPC ...... G09F 7/00; G09F 7/18; G09F 2007/1834; G09F 15/00
See application file for complete search history.

(56) References Cited

U.S. PATENT DOCUMENTS

| | | | | |
|---|---|---|---|---|
| 4,259,803 | A | 4/1981 | Sittler | |
| 4,660,310 | A * | 4/1987 | Farmer | G09F 15/0006 40/607.06 |
| 4,885,860 | A | 12/1989 | Huenefeld | |
| 5,016,372 | A | 5/1991 | Gold | |
| 5,682,696 | A | 11/1997 | Gill | |
| 6,397,451 | B1 | 6/2002 | Gill | |
| 7,367,147 | B2 | 5/2008 | Harms | |
| 7,401,430 | B2 | 7/2008 | Lindquist | |
| 8,572,872 | B1 | 11/2013 | Michalczak | |
| 2009/0119961 | A1 | 5/2009 | Harms | |
| 2014/0201952 | A1 * | 7/2014 | Windorski | G09F 3/12 156/227 |

* cited by examiner

*Primary Examiner* — Cassandra Davis
(74) *Attorney, Agent, or Firm* — AVEK IP, LLC; Mark C. Young

(57) ABSTRACT

A sign having a display section and a support member that can be removably secured to the display section. The support may be secured within a pocket or receptacle formed in the display section. The pocket may be created in the display section by portions of adhesive, including hot melt adhesive and pressure sensitive adhesive. The pocket allows a smaller support member than conventional wire frames while holding the display section above the ground at a height similar to conventional frames.

14 Claims, 12 Drawing Sheets

SIGN WITH INSERTABLE FRAME

CROSS-REFERENCE TO RELATED APPLICATIONS

This application is a continuation of co-pending application Ser. No. 17/731,001, filed Apr. 27, 2022, titled SIGN WITH INSERTABLE FRAME, which claims the benefit of U.S. provisional application Ser. No. 63/180,554, filed Apr. 27, 2021, titled SIGN WITH INSERTABLE FRAME.

FIELD

The present invention relates generally to signage. More specifically, the invention relates to a yard sign having a display section with first and second panels fastened together and a supporting frame that is insertable into the display section and securable thereto. The frame and display section can be joined by an end-user prior to use.

BACKGROUND

Ground-based signage is a popular method of communicating with passersby. There are various types of ground-based signs, but one type that is widely used is a wire-frame sign that can be placed in residential yards or commercial lawns. Such signs are relatively inexpensive and easy to install, which has helped increase their popularity. They are ubiquitous during elections, often used to show support for candidates, and they have become a popular way of offering congratulations for birthdays, anniversaries, and school graduations. One of the benefits of using a yard sign is visibility. They are highly visible, in part, because they are supported well above the ground by a wire frame. Traditionally, the frame consists of a single piece of wire bent to form two vertical legs joined by a horizontal upper member.

Wire-frame signs are not without drawbacks. In order to provide performance and durability, manufacturers have tended to maximize the amount of wire used for the frame. Also, yard signs typically require a frame having a vertical dimension that is much greater than the vertical dimension of the sign it supports. This is necessary to ensure that the sign is positioned well above the ground while still allowing a portion of the frame to be inserted into the ground. This large wire frame can make packaging and shipping the product difficult and expensive. It can also be challenging to keep costs down when mass producing such signs and frames due to their size and shape.

A need exists for a yard sign that offers the durability and low cost expected by consumers, but is also easy to package and ship economically. The present invention addresses that need.

SUMMARY

The present invention comprises a sign having a display section and a support member, such as a frame, that can be removably secured to the display section. In one embodiment, the display section and support member have similar dimensions, making the two components easier to package and ship than traditional wire-frame signs. Additionally, as described in more detail below, the unique support member design may be smaller than a conventional wire frame, which decreases the amount of material needed to support the display section. The support may be secured within a pocket or receptacle formed in the display section. The pocket allows the smaller support member to hold the display section above the ground at a height similar to conventional frames.

The display section may include a first panel and a second panel, with both panels joined by an adhesive or a heat sealing or fusing method. The first and second panels may be attached at a crease. For example, the display section may include a singular piece of material, such as cardboard, that is folded at a crease with the first and second panels being on opposite sides of the crease. The pocket or receptacle may be formed in the display section between the first and second panels, with the pocket being formed between at least two portions of adhesive, such as hot melt adhesive and/or pressure sensitive adhesive. The display section may also include one or more securing mechanisms, such as a piece of pressure sensitive adhesive, located between the first and second panels to selectively secure the first and second panels together. Pressure sensitive adhesive can also serve the purpose of adhering to or gripping the wire or frame support member to help keep it engaged with the display section.

The securing mechanism may be located proximate the periphery of the pocket or offset inwardly from the periphery toward the middle of the pocket. If the securing mechanism is offset from the periphery, the mechanism can be used to form a retention cavity within the pocket for holding or gripping a portion of the support member (also referred to herein as a frame). The cavity may be formed after the support member is inserted in the pocket to essentially lock a portion of the support member in the cavity, which holds the support member in the pocket. By holding the support member in the pocket, the display section remains engaged with the support member and resists separation when encountering wind, rain, or other outdoor elements. This unique configuration allows the support member and display section to be packaged and shipped in a disassembled state. An end-user can then join the support member and display section prior to use.

The securing mechanism may take a number of forms including a piece or dollop of pressure sensitive adhesive, which may also be referred to as a full pressure sensitive hot melt adhesive or a butyl-type adhesive. The securing mechanism could also take the form of a fastener such as a hook and loop fastener, snap, threaded fastener, tied fastener, pin or any other fastener suitable for joining panels.

The support member or frame portion may have an upper portion adapted for insertion into the pocket and a lower portion adapted for insertion into the ground. In an exemplary embodiment, the lower portion comprises two wires, however other materials and configurations are foreseen such as rods or legs made out of metal, wood or plastic. The upper portion of the support member may contact a first piece of pressure sensitive adhesive when inserted in the pocket or receptacle. The first piece of pressure sensitive adhesive may be located closer than the upper portion of the support member to the crease when the support member is inserted into the pocket. There may also be a second piece of pressure sensitive adhesive, which may be located farther than the upper portion of the support member from the crease when the support member is inserted into the pocket.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
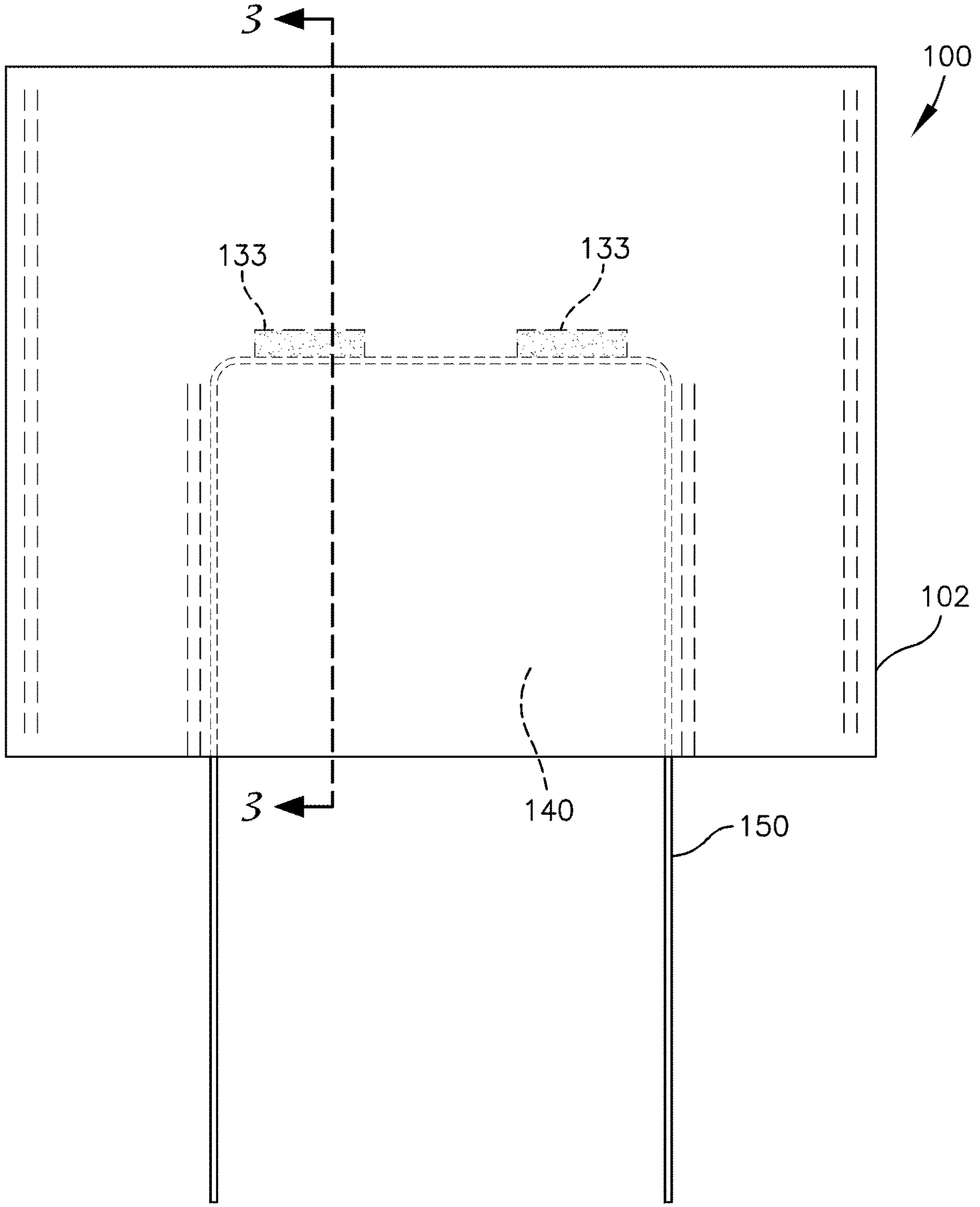
FIG. 1 is a front view of an embodiment of a sign with a removably securable frame.
Figure 2:
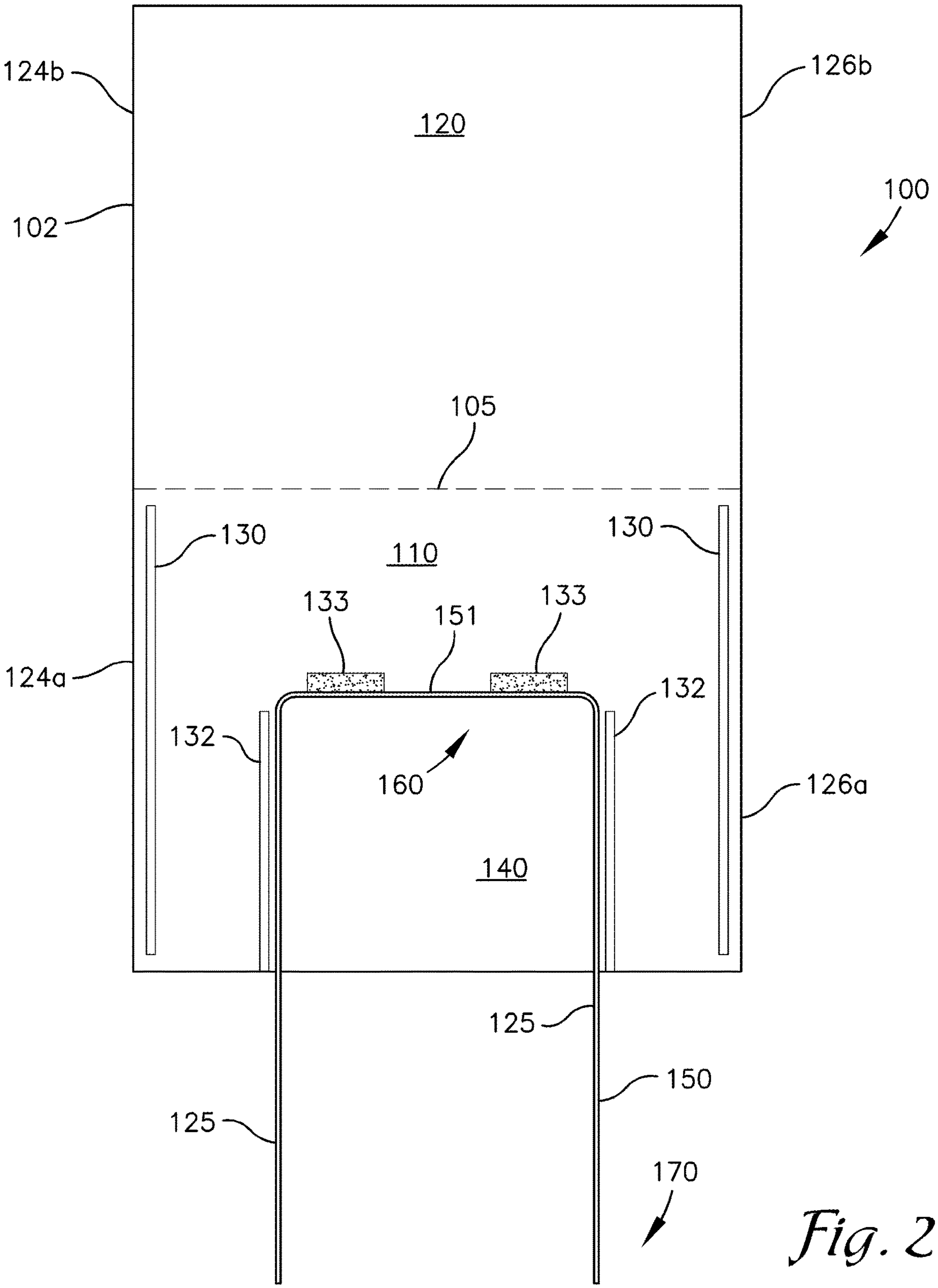
FIG. 2 is a front view of the sign of FIG. 1 with the display section in the open position.

As best seen in FIGS. 1 and 2, an exemplary embodiment of the invention comprises a sign 100 having a display section 102, a receptacle or pocket 140 formed in the display section 102, a support or frame 150, and a securing mechanism 133 located proximate pocket 140.

As shown in FIGS. 1 and 2, display section 102 may include two rigid or semi-rigid panels, a first panel 110 and a second panel 120, with both panels joined together at their respective peripheries. It is foreseen that first panel 110 and second panel 120 may be constructed of cardboard, plastic, or other suitable materials known in the art. The top of first panel 110 and the top of second panel 120 may be joined by adhesion, welding, or by folding a single large piece of material in half to form a joined top 105. If a single piece of material is folded, the joined top 105 may be in the form of a crease. Similarly, a first edge 124*a* of first panel 110 and a first edge 124*b* of second panel 120 may be joined together, and the second edge 126*a* of first panel 110 and second edge 126*b* of second panel 120 may be joined together. The first and second edges may be joined using an adhesive such as a thermoplastic hot glue or a pressure sensitive adhesive. Perimeter beads or strips of adhesive 130 (e.g., thermoplastic hot glue or pressure sensitive adhesive) may be applied to an interior face of a panel and then used to bond the panels together.

As shown in the figures, strips of adhesive 130 may be applied during the manufacturing process to the first panel 110 near its first edge 124*a* and second edge 126*a*. If hot melt adhesive is used, the second panel 120 may be pressed against first panel 110 at the locations of the strips 130 before the hot melt adhesive solidifies such that the hot melt adhesive bonds the panels together as it cools. While the first and second edges may be bonded using an adhesive, it is foreseen that they may be joined in other ways such as stapling, riveting, or other fasteners. The first and second edges could also be folded.

As best seen in FIGS. 1-11, sign 100 may include a receptacle or pocket 140 formed in display section 102. Pocket 140 is located between first panel 110 and second panel 120 and adapted to receive an upper portion 160 of a support or frame 150. Various embodiments of pocket 140 and frame 150 will be discussed in more detail below, however one embodiment may include a generally rectangular pocket 140 for receiving an upper portion 160 of a frame 150. As shown in FIGS. 2, 4, 5 and 6, pocket 140 may include strips of adhesive that form the border of pocket 140. These border strips of adhesive 132 may take the form of hot melt (e.g., thermoplastic hot glue) or pressure sensitive adhesive located on the sides, corners and/or top of pocket 140. Like the edge strips of adhesive 130, the border strips 132 may be applied during the manufacturing process to the first panel 110. The border strips of adhesive 132 may be applied at the same time as the edge strips of adhesive 130. The second panel 120 may be pressed against first panel 110 at the locations of the border strips 132 and edge strips 130 to bond the panels together. It is foreseen that other mechanisms could also be used to form a border of pocket 140 such as stapling, riveting, or other fasteners.

Figure 5:
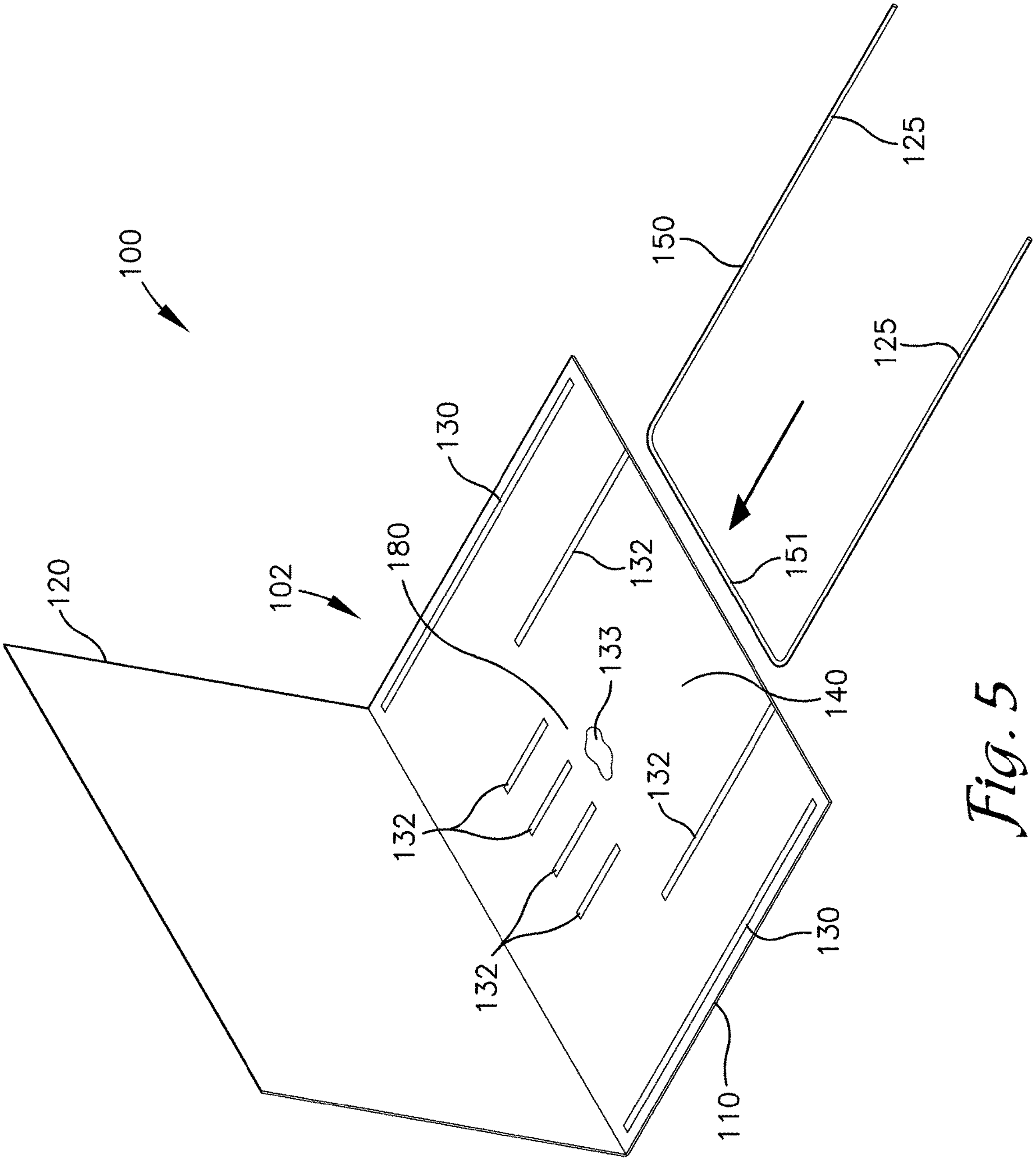
FIG. 5 is a perspective view of an alternate embodiment of a sign with a removably securable frame.
Figure 6:
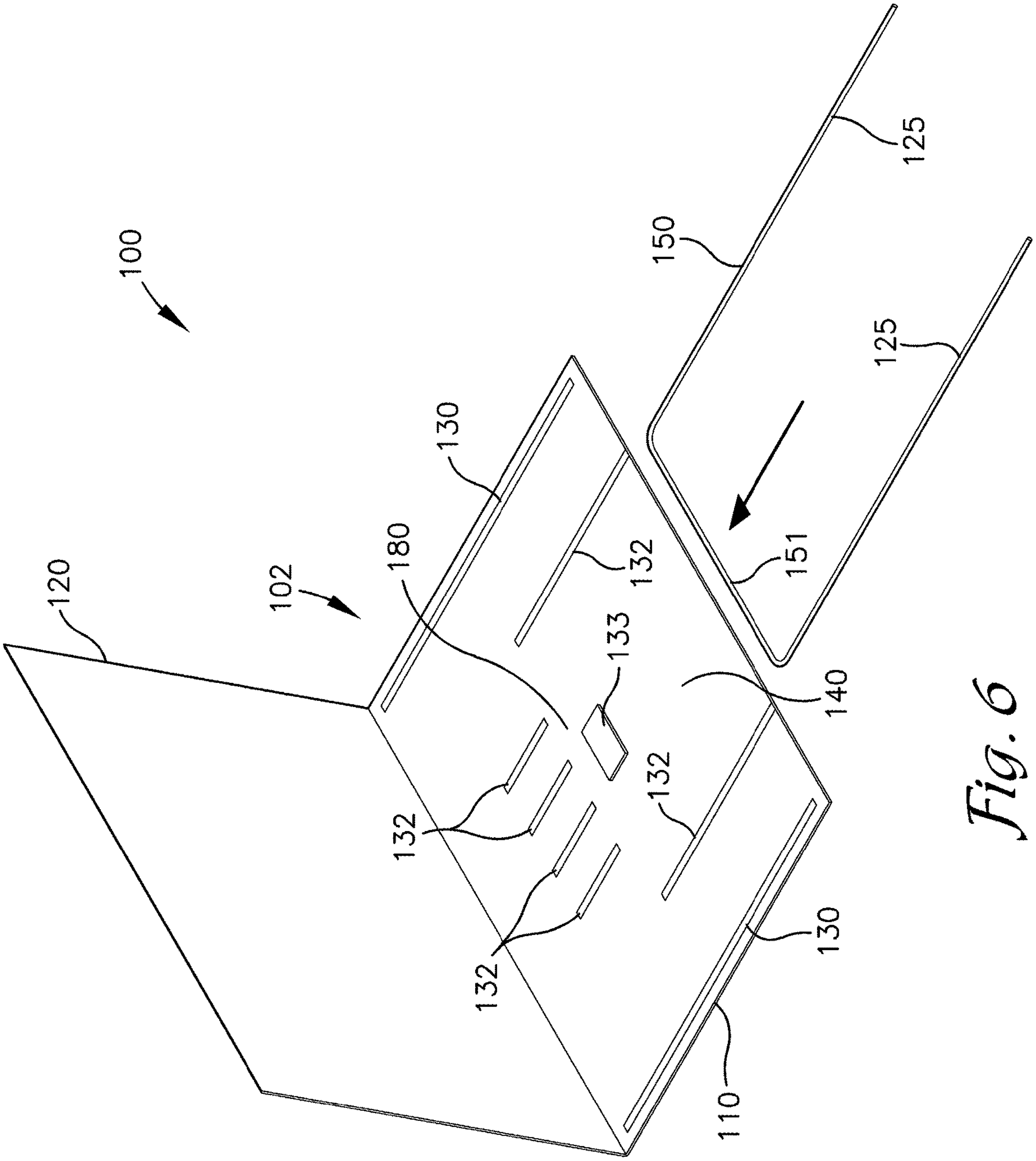
FIG. 6 is a perspective view of an alternate embodiment of a sign with a removably securable frame.

As shown in the figures, receptacle or pocket 140 may be shaped to approximate an upper portion 160 of frame 150. The periphery of pocket 140 may be created by the first and second panels 110 and 120 being bonded by the border strips of adhesive 132. A portion of the periphery of pocket 140 is formed at the location where the panels are bonded together. Accordingly, the size and shape of pocket 140 may be dictated by the orientations of the border strips of adhesive 132. For example, as shown in FIGS. 5-6, border strips of adhesive 132 may be located on the sides and top of pocket 140. The side strips restrict lateral movement of the frame 150 within pocket 140 and the top strips restrict upward movement of the frame 150. This configuration allows display section 102 to be engaged with frame 150 by receiving frame 150 within pocket 140. Additional embodiments are discussed below.

Frame 150 may comprise two legs 125 extending downwardly from an upper horizontal member 151. Each leg 125 may be a relatively slender rod or segment of wire with sufficient strength to keep sign 100 upright. Once installed, sign 100 could encounter various outdoor elements including wind, rain and snow. Each leg 125 is constructed to keep sign 100 generally upright when such elements are encountered. Sign 100 may be designed such that the legs 125 flex somewhat, such as if blown by wind or hit by a person or object. However, each leg is relatively resilient and can return sign 100 to its upright position after being flexed. Legs 125 can be constructed of various types of materials (e.g., plastic, metal, wood, or composite), however it is foreseen that leg members 125 made of heavy-duty wire (e.g., spring steel wire) would be suitable for many applications. Each leg 125 may be long enough to be inserted into the ground while still holding the display section 102 in a spaced configuration with respect to the ground. For example, in one embodiment, display section 102 may be supported approximately two feet above the ground.

Legs 125 may extend downwardly from opposite ends of horizontal member 151. The length of horizontal member 151 may be such that the width of frame 150 closely approximates the width of pocket 140. Horizontal member 151 may be constructed of the same material as the legs 25 or it may be constructed of a different material. It is foreseen that heavy-duty wire (e.g., spring steel wire) may be a suitable material for the horizontal member 151 in many applications. In an exemplary embodiment, a single piece of heavy-duty wire may be fashioned into the legs 125 and horizontal member 151 by bending the wire into an inverted U-shape with generally squared-off corners (FIGS. 1, 2, 4-6, 10-12).

As shown in FIGS. 1-7, 10, and 11, sign 100 may also include one or more securing mechanisms 133 located proximate pocket 140. Securing mechanism 133 may take the form of a piece or dollop of adhesive, such as a pressure sensitive adhesive, which may also be referred to as a full pressure sensitive hot melt adhesive or a butyl-type adhesive. The pieces could be strips of material or double-sided tape. The adhesive may be partially or completely applied during the manufacturing process. A securing mechanism 133 in the form of adhesive may also serve the purpose of adhering to frame 150 when inserted into pocket 140 to help keep the frame engaged with display section 102. Securing mechanism 133 may also take the form of a fastener such as a hook and loop fastener, snap, threaded fastener, tied fastener, pin or any other fastener suitable for joining panels.

The securing mechanism 133 may be located proximate the periphery of pocket 140 or offset inwardly from the periphery toward the middle of pocket 140. If the securing mechanism 133 is offset from the periphery, in certain embodiments, the mechanism can be used to form a retention cavity 180 within the pocket 140 for holding a portion of frame 150. Cavity 180 is identified on the figures by showing the location where it would exist when the first and second panels 110 and 120 are joined together. The cavity 180 may be formed after frame 150 is inserted into pocket 140 to trap an upper portion 160 of frame 150 in the cavity 180, thereby holding frame 150 in pocket 140. Holding frame 150 in pocket 140 helps display section 102 remain engaged with frame 150 when faced with outdoor elements such as wind.

Figure 3:
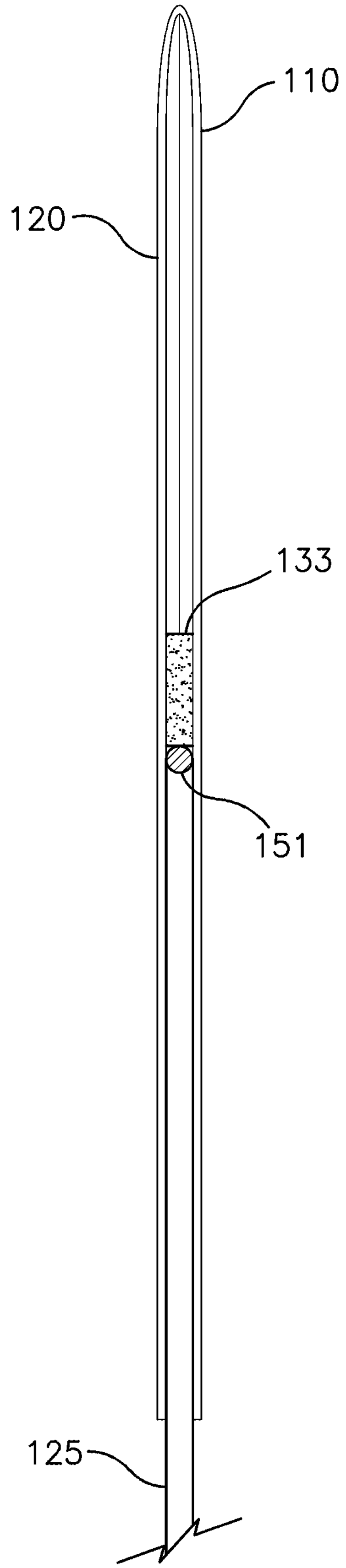
FIG. 3 is a cross-sectional view of the sign of FIG. 1 taken along line 3-3 in FIG. 1.
Figure 4:
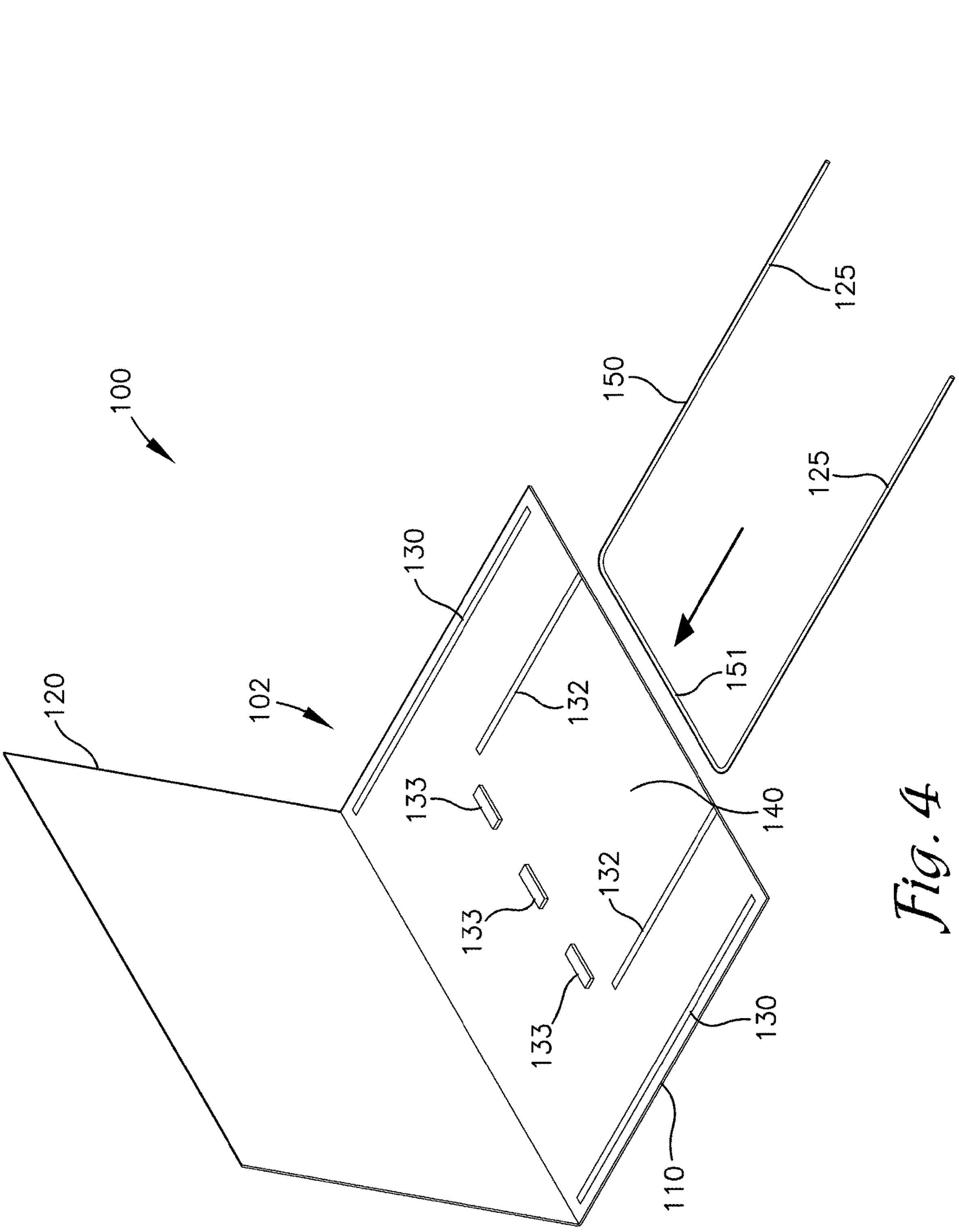
FIG. 4 is a perspective view of an alternate embodiment of a sign with a removably securable frame.

As shown in FIGS. 1-4, an exemplary embodiment of the invention comprises a generally rectangular pocket 140 having border strips of adhesive 132 on the sides of the pocket and a plurality of securing mechanisms 133 at the top of the pocket. The securing mechanisms 133 in FIGS. 1 and 2 may take the form of pieces of pressure sensitive adhesive (e.g., butyl-type adhesive). As best seen in FIG. 3, when frame 150 is inserted into pocket 140, an upper portion 160 of the frame may contact and adhere to the securing mechanisms 133. Adhesion of frame 150 to securing mechanism 133 helps the keep the display section 102 engaged with the frame 150 when faced with wind, severe weather, or other adverse conditions. A lower portion 170 of frame 150 may be inserted into the ground. Sign 100 may be substantially constructed by a manufacturer, with an end user simply inserting frame 150 into a display section 102 prior to use. As shown in FIG. 12, frame 150 and display section 102 may be stacked in a disassembled state for packaging, and then shipped to a user for assembly. Additional embodiments of the invention are shown in FIGS. 5-11.

FIG. 5 illustrates an embodiment where display section 102 includes a generally rectangular pocket 140 having border strips of adhesive 132 on the sides and the top of the pocket. A securing mechanism 133 is offset downwardly from the top of pocket 140. The securing mechanism 133 may be a piece or dollop of pressure sensitive adhesive (e.g., butyl type adhesive). The securing mechanism 133 can be used to form a retention cavity 180 within pocket 140 for holding an upper portion 160 of frame 150. The cavity may be formed around the upper portion 160 after the frame is inserted into the pocket 140.

The sign 100 embodied in FIG. 5 may be constructed in stages. The first stage is construction by a manufacturer. The first and second panels 110 and 120 may be bonded by a manufacturer using the edge strips 130 and border strips 132 of adhesive to form display section 102. Securing mechanism 133 may also be applied in pocket 140 by the manufacturer. The securing mechanism 133 may be adhered to one or both of the panels when sign 100 is received by a customer. The second stage of construction may be done by an end-user. To assemble sign 100, a user can separate the portions of panels 110 and 120 in the pocket 140, including separating one of the panels from securing mechanism 133, and insert frame 150 into the pocket such that an upper portion 160 travels past or above securing mechanism 133. The upper portion 160 of frame 150 may then be located in the cavity 180 section of pocket 140. The user may press the panels 110 and 120 together at the location of the securing mechanism 133 thereby securing the panels together at that location and trapping the upper portion 160 within cavity 180. At this point, frame 150 resists separating from display section 102 because its upper portion 160 is trapped in cavity 180. The sign 100 is ready for use by inserting lower portion 170 of frame 150 into the ground.

FIG. 6 illustrates an embodiment similar to FIG. 5, except that the securing mechanism 133 is a strip of double-sided tape with one side adhered to a panel and the other side covered with a release liner or backing film. The sign 100 may be shipped to an end-user with the securing mechanism 133 partially covered by a release liner, and the end-user may peel off the liner to expose the adhesive when it is time to form cavity 180.

Figure 7:
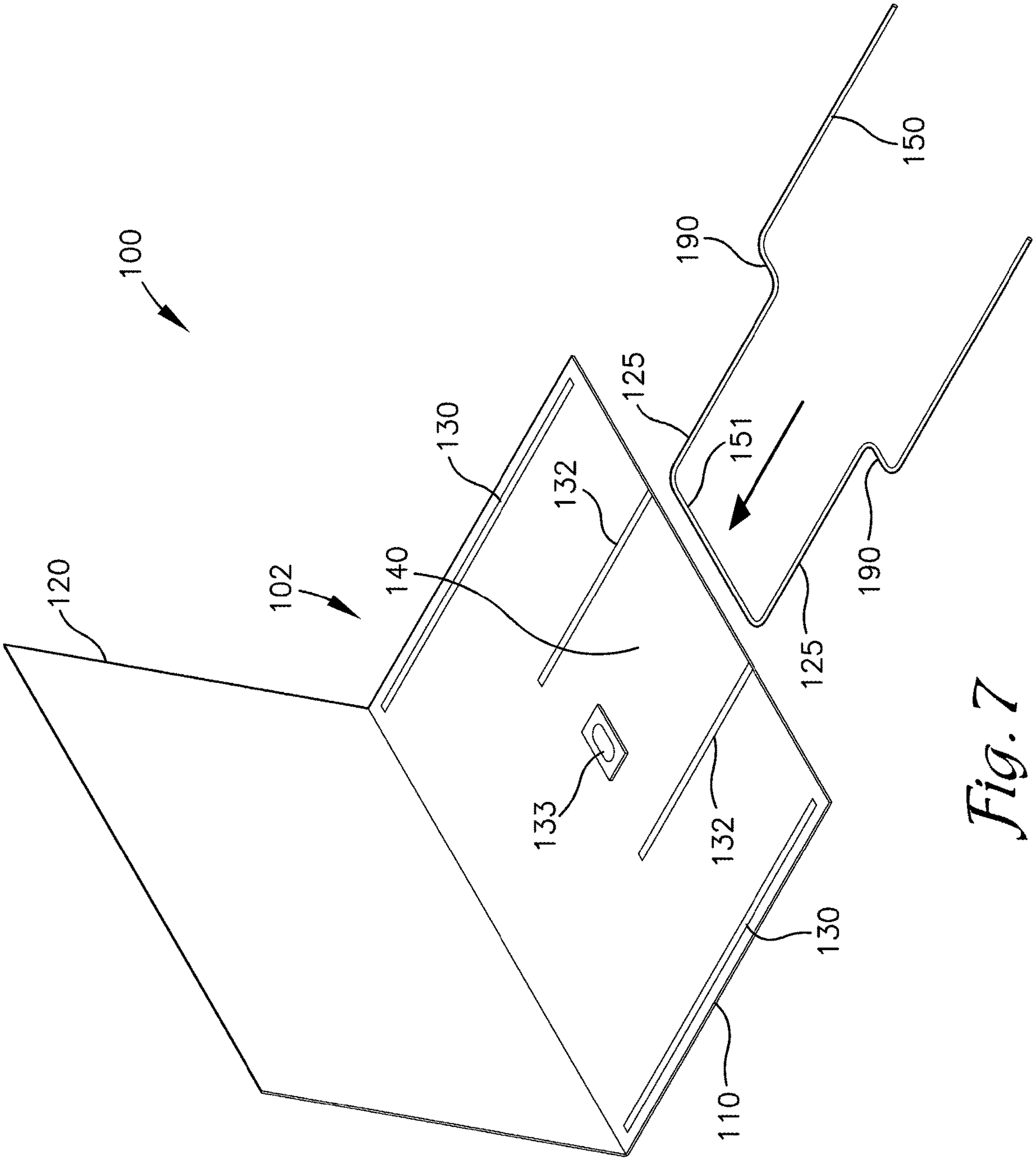
FIG. 7 is a perspective view of an alternate embodiment of a sign with a removably securable frame.

FIG. 7 illustrates an embodiment where display section 102 includes a generally rectangular pocket 140 having border strips of adhesive 132 on the sides of the pocket. In this embodiment, there is no adhesive forming a top of the pocket. A securing mechanism 133 is located between the side border strips 132 and it may be downwardly spaced from the tops of the strips. The securing mechanism 133 may be a piece or dollop of pressure sensitive adhesive (e.g., butyl-type adhesive) or a piece of double-sided tape. The securing mechanism 133 can be used to form a stop when it is adhered to both panels 110 and 120, which can keep the upper portion 160 of frame 150 from moving downward past the securing mechanism thereby keeping frame 150 from retracting out of pocket 140. Frame 150 may include horizontal segments 190 on one or both of legs 125 that catch on the bottoms of border strips 132. When the horizontal segments 190 catch on the strips 132, the frame 150 resists further insertion into pocket 140. Accordingly, the horizontal segments 190 engage with strips 132 to keep the frame 150 from moving too far into pocket 140, and securing mechanism 133 keeps the frame 150 from retracting out of pocket 140 once the upper portion 160 is inserted past the securing mechanism 133.

Like other embodiments, the sign 100 shown in FIG. 7 may be constructed in stages. The first stage is construction by a manufacturer. The first and second panels 110 and 120 may be bonded by a manufacturer using the edge strips 130 and border strips 132 of adhesive to form display section 102. Securing mechanism 133 may also be applied in pocket 140 by the manufacturer. The securing mechanism 133 may be adhered to one or both of the panels when sign 100 is received by a customer. The second stage of construction may be done by an end-user. To assemble sign 100, a user can separate the portions of panels 110 and 120 in the pocket 140, including separating one of the panels from securing mechanism 133, and insert frame 150 into the pocket such that an upper portion 160 travels past or above securing mechanism 133. The horizontal segments 190 on legs 125 may be located such that they do not catch on strips 132 until upper portion 160 is properly located above securing mechanism 133. The user would not need to monitor the location of upper portion 160 in pocket 140 and could instead rely on the fact that that the horizontal segments 190 will stop insertion of the frame 150 into pocket 140 when upper portion 160 is properly located. The user may then press the panels 110 and 120 together at the location of the securing mechanism 133 thereby securing the panels together at that location and trapping the upper portion 160 within display section 102. At this point, frame 150 resists separating from display section 102 because its upper portion 160 is stopped from retracting from pocket 140 by the securing mechanism 133. The sign 100 is ready for use by inserting lower portion 170 of frame 150 into the ground.

Figure 8:
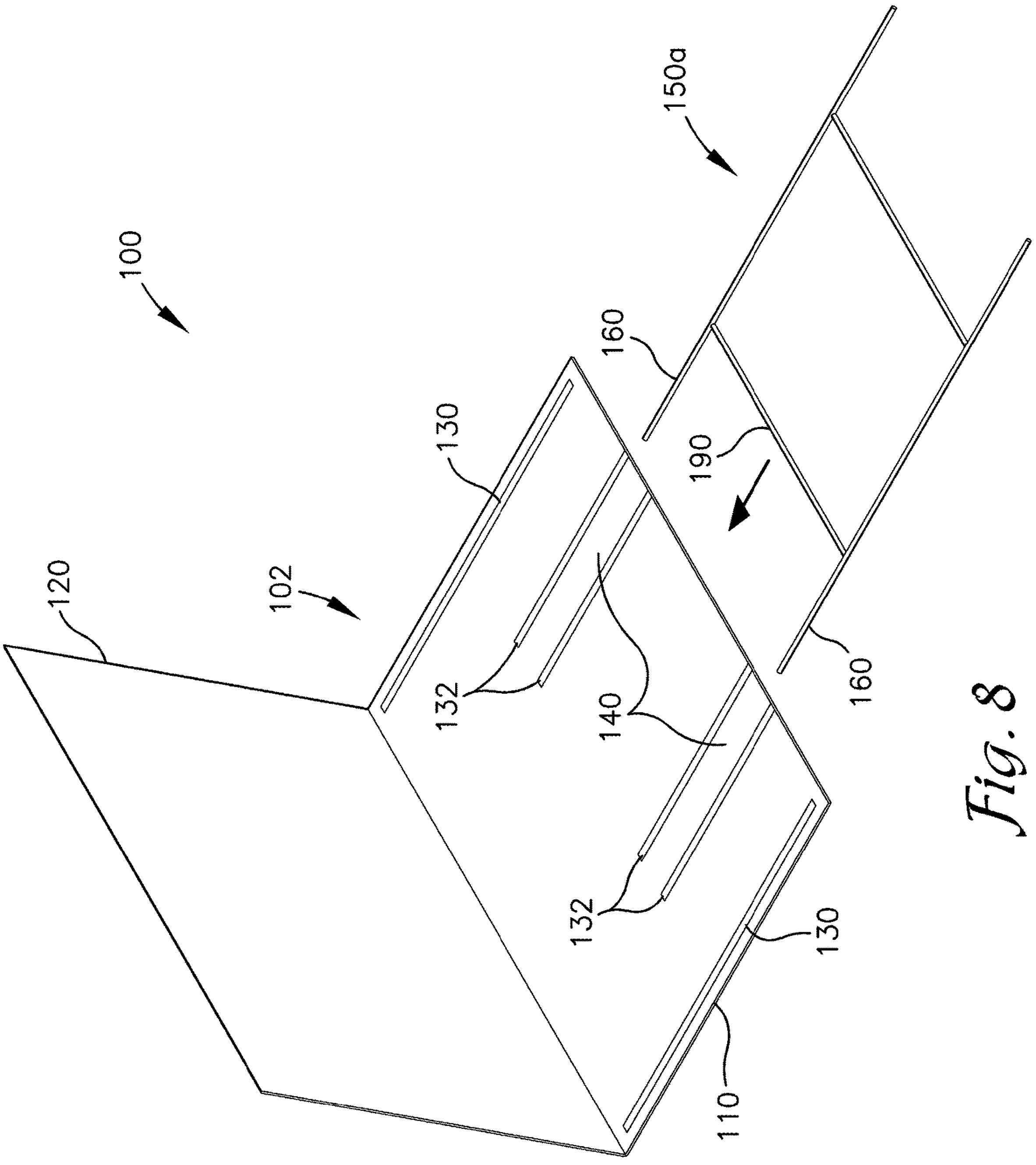
FIG. 8 is a perspective view of an alternate embodiment of a sign with a removably securable frame.
Figure 9:
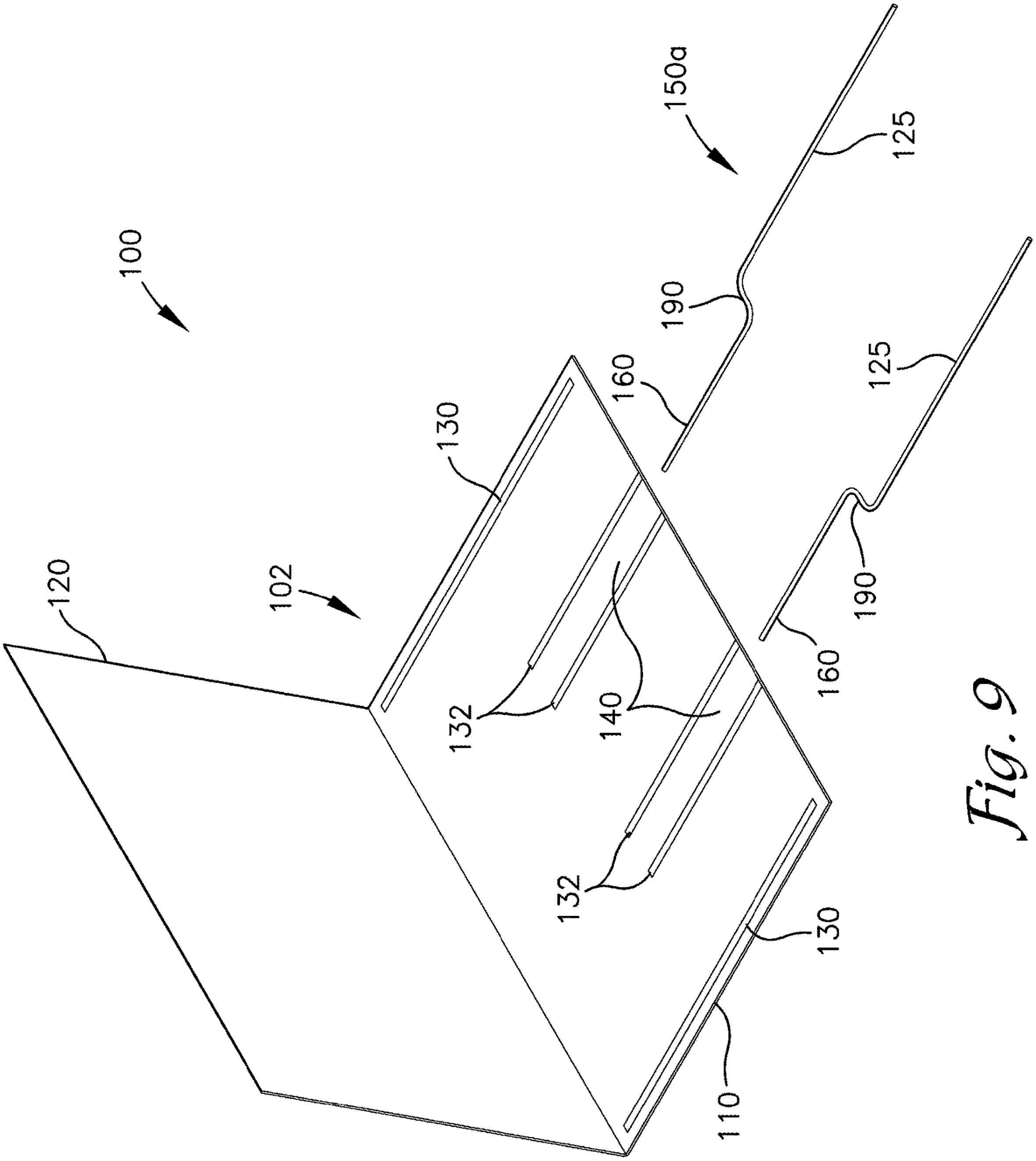
FIG. 9 is a perspective view of an alternate embodiment of a sign with a removably securable frame.

FIGS. 8 and 9 illustrates an embodiment where display section 102 includes two smaller, generally parallel pockets 140. Each pocket 140 has border strips of adhesive 132 on the sides of the pocket. In this embodiment, there is no adhesive forming tops of the pockets. Frames **150*a* have an upper portion 160, such as a vertical member, that may be inserted into each pocket 140. The frames 150*a* shown in FIGS. 8 and 9 may also utilize horizontal segments 190 attached to or formed in one or both of legs 125 that catch on the bottoms of border strips 132. When the horizontal segments 190 catch on the strips 132, the frame 150*a* resists further insertion into pocket 140, ensuring that the frame 150*a* does not move too far into pocket 140. The frame 150*a* shown in FIG. 8, may be referred to as an H-style frame, and the frame 150*a* shown in FIG. 9 comprises two un-joined legs 125. It is foreseen that the signs 100 shown in FIGS. 8 and 9 may or may not utilize a securing mechanism 133. The signs 100 may be substantially constructed by a manufacturer, with an end user simply inserting frames 150*a* into a display section 102 prior to use. Pockets 140 may be shaped and sized such that the upper portion 160 of frame 150*a*** received within each pocket is held snugly by friction.

Figure 10:
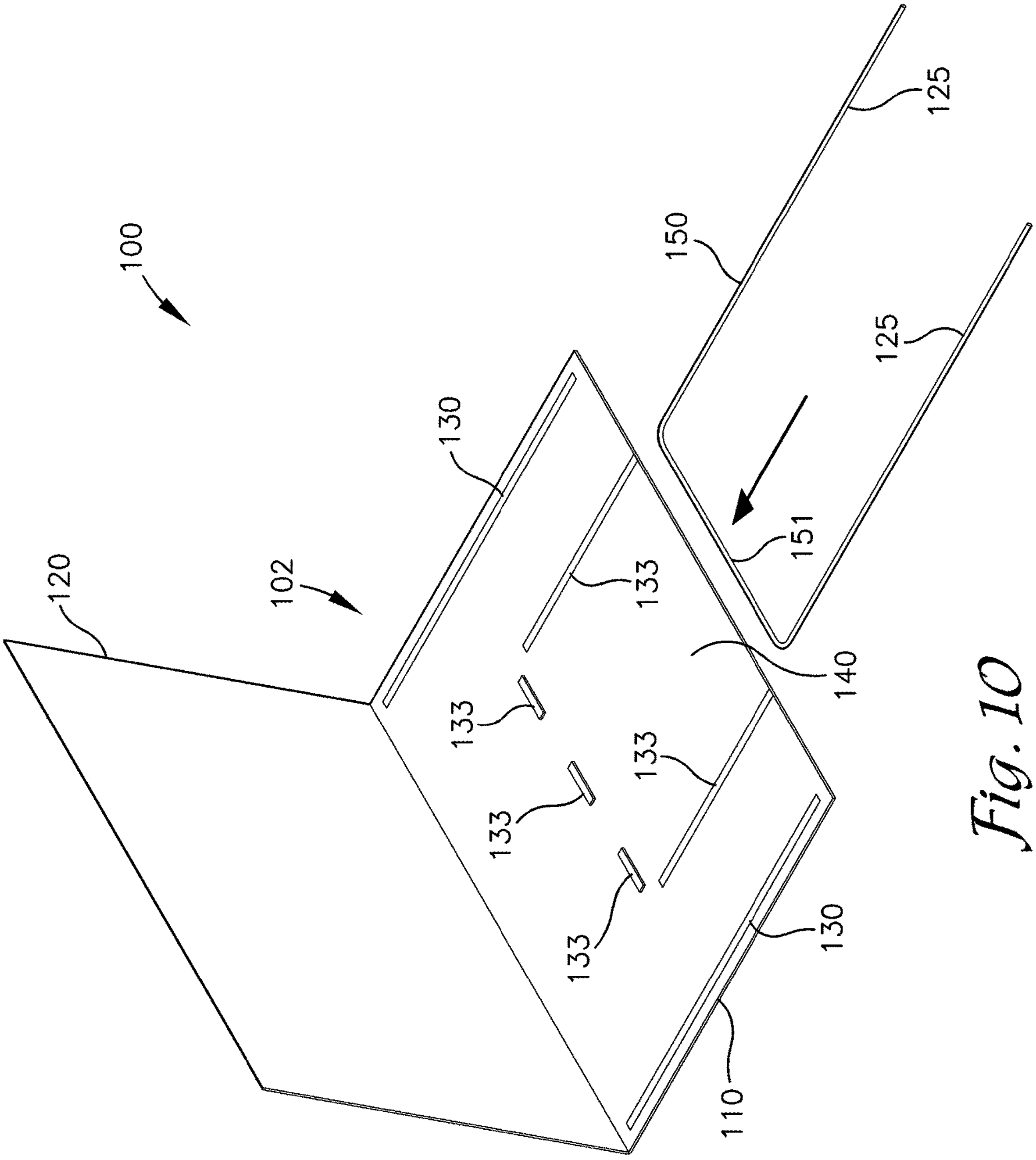
FIG. 10 is a perspective view of an alternate embodiment of a sign with a removably securable frame.
Figure 11:
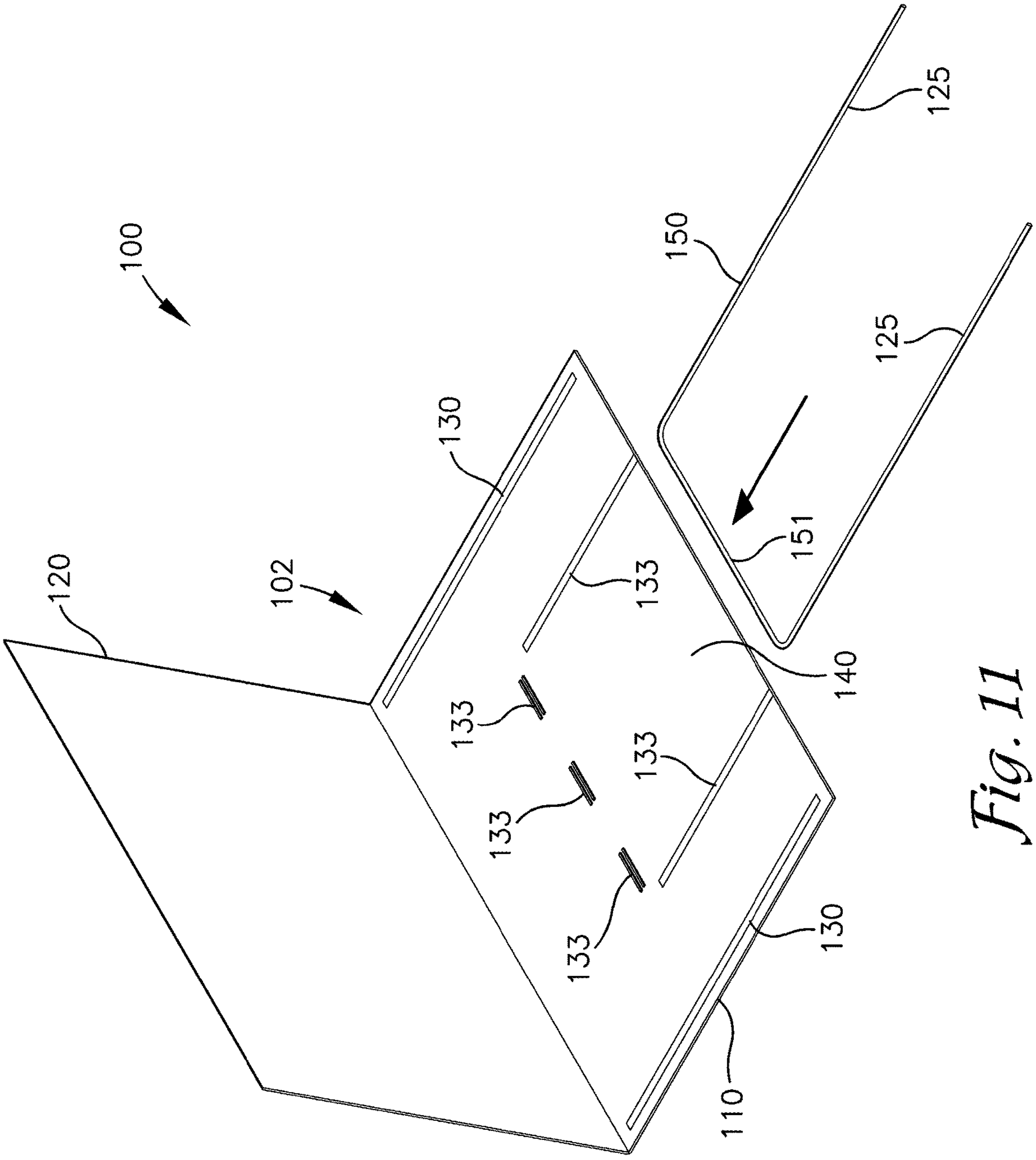
FIG. 11 is a perspective view of an alternate embodiment of a sign with a removably securable frame.
Figure 12:
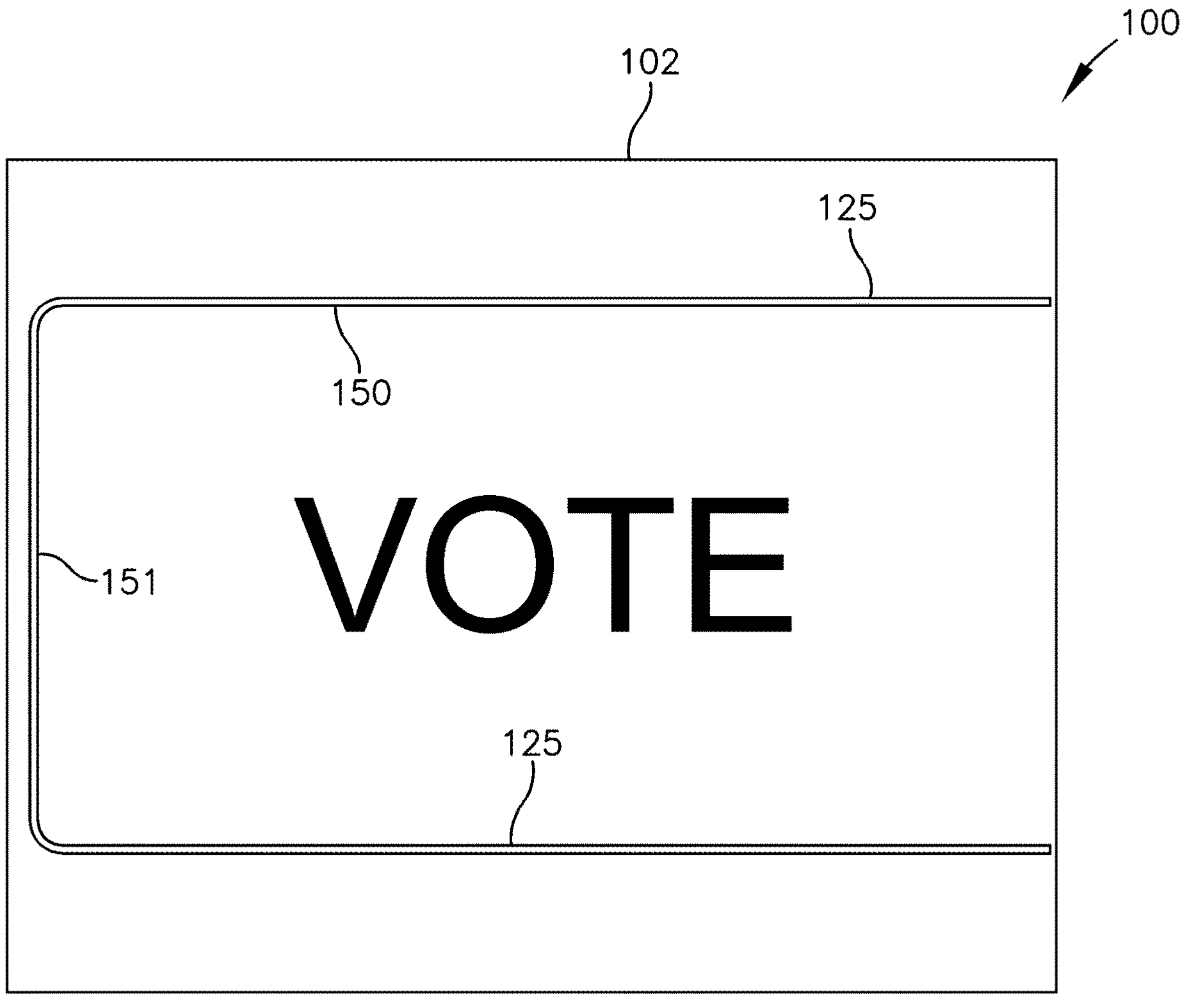
FIG. 12 is a front view of a sign with a removably securable frame prepared for packaging.

FIGS. 10 and 11 illustrate embodiments similar to the signs in FIGS. 1-4. Certain adhesive strips shown in FIGS. 10 and 11 comprise pressure sensitive adhesive (e.g., butyl-type adhesive) rather than thermoplastic hot glue. Turning first to FIG. 10, the sign 100 shown in this figure may utilize pressure sensitive adhesive for all strips around pocket 140. By making all strips on the periphery of pocket 140 out of pressure sensitive adhesive, all of the strips function as securing mechanisms 133. Frame 150 may be inserted into pocket 140 until it contacts one or more of the securing mechanisms 133, at which point it can adhere to the securing mechanism 133 (as shown in FIG. 3). It is foreseen that, depending on the size and shape of pocket 140, frame 150 may contact and adhere to one or more (or even all) of the securing mechanisms 133 shown in FIG. 10. As explained above, adhesion of frame 150 to securing mechanism 133 helps the keep the display section 102 engaged with the frame 150 when faced with wind, severe weather, or other adverse conditions. Turning to FIG. 11, the sign 100 shown in this figure may utilize pressure sensitive adhesive for all strips around pocket 140 like the sign in FIG. 10, but it may also use pressure sensitive adhesive for all edge strips 130. This would eliminate thermoplastic hot glue entirely from sign 100, which may have manufacturing benefits.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A sign comprising:
a display section having a first panel and a second panel;
a first adhesive distributed between and adhered to an interior surface of each of said first and second panels to secure the panels together to form a pocket therebetween, the pocket having an opening along a bottom edge of the joined panels;
a wire support member removably securable to said display section, said support member having an upper portion adapted for insertion into said pocket; and
a securing mechanism, comprising a first piece of pressure sensitive adhesive, positioned between and secured to each of said first and second panels;
wherein the securing mechanism is positioned such that at least a portion of the wire support member when inserted into the pocket contacts the securing mechanism such that simultaneous contact of the securing mechanism, the wire support member, and each of the first and second panels forms a structural connection that retains the wire support member within the pocket and maintains alignment of the first and second panels.

2. The sign of claim 1, wherein said support member comprises a lower portion adapted for insertion into the ground.

3. The sign of claim 2, wherein said lower portion of said support member comprises at least one linear member.

4. The sign of claim 1, wherein the securing mechanism comprises a plurality of pieces of pressure sensitive adhesive.

5. The sign of claim 4, wherein said pocket is formed positioned between said plurality of pieces of pressure sensitive adhesive.

6. The sign of claim 1, wherein the first adhesive comprises a pressure sensitive adhesive.

7. A sign comprising:
a display section having a first panel and a second panel;
a receptacle formed in said display section between said first and second panels when said first and second panels are attached together by an adhesive;
a securing mechanism, comprising a piece of pressure sensitive adhesive positioned between and secured to said first and second panels; and
a support adapted for insertion into said receptacle such that at least part of said support contacts said securing mechanism when inserted in said receptacle such that simultaneous contact between the securing mechanism, the support, and each of the first and second panels forms a structural connection that retains the support within the receptacle and maintains alignment of the first and second panels.

8. The sign of claim 7, wherein said first and second panels are attached at a crease.

9. The sign of claim 8, wherein said support comprises an upper portion and a lower portion.

10. The sign of claim 9, wherein said lower portion of said support is adapted for insertion into the ground.

11. The sign of claim 10, wherein said support mechanism is positioned to contact said upper portion of said support when said support is inserted in said receptacle.

12. A sign comprising:

a display section having a first panel and a second panel attached at a crease;

a first adhesive distributed between and adhered to an interior surface of each of said first and second panels to secure the panels when folded together at the crease to form a pocket therebetween, the pocket having an opening along a bottom edge of the joined panels; and a support member removably securable to said display section, said support member having a lower portion adapted for insertion into the ground and an upper portion adapted for insertion into said pocket, wherein at least part of said support member when inserted into the pocket contacts a securing mechanism comprising at least one piece of pressure sensitive adhesive positioned between and secured to each of said first and second panels such that simultaneous contact of the securing mechanism, the support member, and each of the first and second panels forms a structural connection that retains the support member within the pocket and maintains alignment of the first and second panels.

13. The sign of claim 12, wherein said lower portion of said support member comprises at least one linear member.

14. The sign of claim 13, wherein said pocket is positioned between at least two pieces of said pressure sensitive adhesive.

* * * * *